C. J. MERRILL.
SEPARATOR.
APPLICATION FILED JULY 24, 1919.
1,382,846.
Patented June 28, 1921.
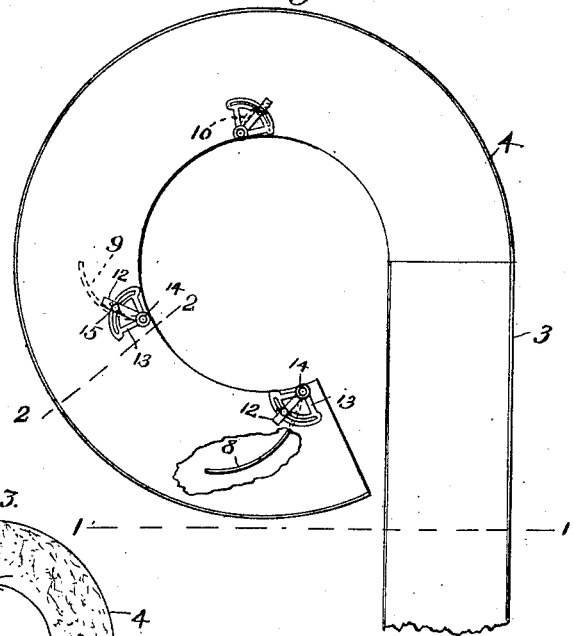
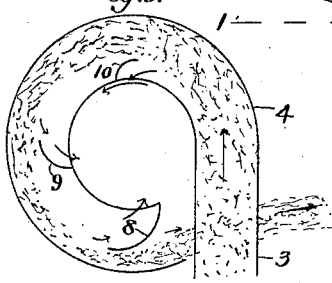
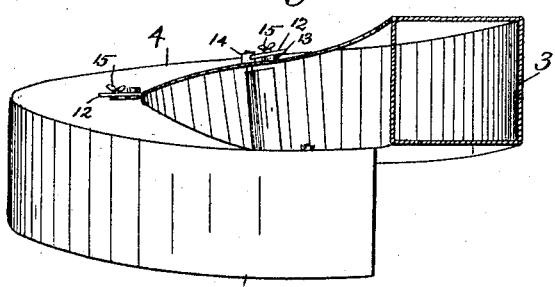
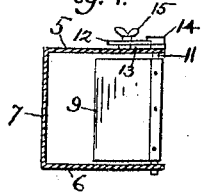
Inventor
Carle J. Merrill
by S. W. Bates
Atty.

UNITED STATES PATENT OFFICE.

CARLE J. MERRILL, OF PORTLAND, MAINE.

SEPARATOR.

1,382,846.   Specification of Letters Patent.   Patented June 28, 1921.

Application filed July 24, 1919. Serial No. 313,013.

*To all whom it may concern:*

Be it known that I, CARLE J. MERRILL, a citizen of the United States, residing at Portland, in the county of Cumberland and State of Maine, have invented certain new and useful Improvements in Separators, of which the following is a specification.

My invention relates to separators for separating heavier-than-air material from the air employed in blowing such material.

These separators are commonly used in mills for separating sawdust, shavings, chips and other like material where the material is removed by a fan from the place where it is produced and delivered to the boiler or some other suitable point where it is to be stored or used.

These separators are usually made in the form of a cylindrical hopper into which the air and the material being separated enter tangentially. The air passes off through a central opening making a sharp upward turn and the material drops out from the bottom of the hopper.

These separators are bulky, they consume a great deal of power to keep them in operation and the separation is generally so incomplete that they frequently have to be placed on the outside of the building to take care of the fine dust that comes from them.

The object of my invention is to construct a simple apparatus which, among other things, will separate the air from the material being treated and gradually check the air velocity, acting on the principle that the less the velocity of the air current the more readily the heavier-than-air material will separate or settle out of it.

I accomplish the object of the invention by blowing the material into a curved spout preferably formed into a spiral, the side of the spout nearest the center of curvature being left open so that the air is constantly escaping, the current is constantly diminishing and the centrifugal force acting on the material while constantly diminishing takes effect more readily on the slowly moving material than when the air and the material are moving more rapidly.

The elimination of the air is accentuated by the use of a series of vanes which serve to deflect the air current through the open side of the spout without intercepting any of the material which is being carried by the air.

I have illustrated my invention by means of the accompanying drawing in which:

Figure 1 is a plan of a separator constructed in accordance with my invention,

Fig. 2 is a cross section taken on the line 1—1 of Fig. 1 and showing the separator proper in elevation, Fig. 3 is a diagram illustrating the action of the device on the treated material and Fig. 4 is a section on the line 2—2 of Fig. 1.

Referring to the drawing, 3 indicates the pipe or duct connected with a suitable fan or blower through which the air and the accompanying material are delivered to the separator.

The separator is formed of a curved spout with the side left open nearest the center of the curvature, the spout being connected with the end of the duct 3 so that the air and material in suspension follow around the inner surface of the outer curve.

As here shown, the separator is made in the form of a spiral spout 4 having an upper plate 5, a lower plate 6 and an outer plate 7 leaving an open side on the inner edge of the spiral.

As soon as the air enters the end of the spiral and follows around the curve, centrifugal force begins to act on the suspended material and the slightly compressed air expanding begins to escape through the open inner side thus gradually reducing the velocity of the current.

The suspended material approaches nearer and nearer the outside of the curve, or the outer wall of the separator, until at the point of discharge from the end of the spiral it occupies a relatively thin layer.

The air, meanwhile, has been continually passing out through the inner open side of the curved spout and gradually reducing the velocity of the current.

The separation of the air from the suspended material, however, is relatively slow and gradual and not sufficient to overcome the centrifugal force which constantly impels the material toward the outer wall of the spout.

The consequence of this action is that the air escapes without carrying with it any dust or fine material and at the same time the concentrated shavings or other material is delivered at the point of discharge moving at a comparatively low velocity.

I have shown the spout in the form of a nearly complete spiral, but it is evident that the spiral may be continued indefinitely and may be of varying diameter according to the nature of the material to be treated.

For the purpose of aiding the escape of the air, I have made use of a series of deflecting vanes 8, 9 and 10. Each of these vanes is secured to a spindle 11 having on its upper end an arm 12 which is above the upper plate 5. The arm 12 is attached to a hub 14 and the arm swings on a quadrant 13.

A thumb nut 15 clamps the arm 12 in any desired position and enables the deflecting blade to be adjusted at any desired point.

As here shown, the vanes are pivoted near the inner edge of the curve and are themselves curved to intercept the moving current of air.

The vanes 8, 9 and 10 grow progressively shorter the nearer they approach the point of entry or the beginning of the spiral.

They are thus designed to extend into the path of air as far as possible without intersecting the stream of suspended material.

By the aid of these vanes, the movement of the air through the open side of the spout is accelerated and the separation of the material is more quickly effected.

The separator may be placed in any desired position according to the work to be done and the space available for it, but in any event it occupies a relatively small amount of space and effects the work of separation and the delivery of separated material in a very perfect manner.

A delivery of the material from the end of the spiral may be controlled by the adjustment of the vanes and by the form and extent of the spiral or other curve.

While I have shown my separator in the form of a spiral curve, it is evident that any other form of curve may be used so long as the inner side of the spout is left open for the escape of air. This inner side may not be entirely open and free from obstruction, but it must be open sufficiently so that the air will be allowed to escape freely.

An important point in my separator is the fact that the material may be delivered at the outlet of the apparatus accompanied by any quanity of air or at any velocity required.

In blowing fuel into a boiler it is always necessary to blow with it air enough to carry the material in suspension. If the air and the material enter the furnace with too great quantity, or too great velocity, the air may have a chilling effect on the fire. There should be consequently just the right amount of air with the suspended material to promote combustion.

My apparatus enables these points to be accurately regulated by varying the curvature of the spiral and the velocity of the initial current.

I claim:

1. A separator for heavier-than-air material consisting of a spout open along the entire length of one side to permit the free escape of air and curved or bent from end to end toward the open side with a substantially uniform radius of curvature so that the escaping air through the open side at any given point will be unopposed by the escaping air from any other portion of the spout and having a delivery end for delivering the separated material longitudinally of the spout.

2. A separator for heavier-than-air material consisting of a helical spout open along the entire length of the inner side for the free escape of air so that the escaping air through the open side at any given point will be unopposed by the escaping air from any other portion of the spout.

3. A separator for heavier-than-air material consisting of a helical spout open along the entire length of the inner side for the free escape of air so that the escaping air through the open side at any given point will be unopposed by the escaping air from any other portion of the spout and having a delivery end for delivering the separated material longitudinally of the spout.

4. A separator for heavier-than-air material consisting of an uninclosed helical spout open along its entire length on the inner side to allow the free escape of air and having a delivery end for delivering the separated material longitudinally of the spout.

5. A separator for heavier than air material, consisting of a spout bent laterally with a uniform curvature and opened along the entire inner side of the curve and having a delivery end for delivering the separated material in line with the spout.

In testimony whereof I affix my signature.

CARLE J. MERRILL.